United States Patent
Tsai et al.

(10) Patent No.: US 11,817,018 B2
(45) Date of Patent: Nov. 14, 2023

(54) MESSAGE UPDATING SYSTEM FOR ELECTRONIC LABEL

(71) Applicant: NETRONIX, INC., Jubei (TW)

(72) Inventors: Fang Ming Tsai, Jubei (TW); Jun Sheng Lin, Jubei (TW)

(73) Assignee: Netronix, Inc., Jubei (TW)

( * ) Notice: Subject to any disclaimer, the term of this patent is extended or adjusted under 35 U.S.C. 154(b) by 246 days.

(21) Appl. No.: 17/470,233

(22) Filed: Sep. 9, 2021

(65) Prior Publication Data

US 2023/0008898 A1  Jan. 12, 2023

(30) Foreign Application Priority Data

Jul. 6, 2021 (TW) .................................. 110124715

(51) Int. Cl.
| | |
|---|---|
| *G09F 3/20* | (2006.01) |
| *G06F 3/147* | (2006.01) |
| *G06F 16/23* | (2019.01) |
| *H02J 7/00* | (2006.01) |
| *G08B 7/06* | (2006.01) |

(Continued)

(52) U.S. Cl.
CPC .............. *G09F 3/208* (2013.01); *G06F 3/147* (2013.01); *G06F 16/2379* (2019.01); *G06F 18/22* (2023.01); *G08B 7/06* (2013.01); *H02J 7/00032* (2020.01); *G01V 8/10* (2013.01); *G06V 2201/02* (2022.01)

(58) Field of Classification Search
CPC ...... G09F 3/208; G06F 16/2379; G06F 18/22; G06F 3/147; H02J 7/00032; G08B 7/06
USPC .................................................... 340/815.69
See application file for complete search history.

(56) References Cited

U.S. PATENT DOCUMENTS

| | | | |
|---|---|---|---|
| 6,542,873 B1* | 4/2003 | Goodwin, III | ....... G06Q 20/201 340/5.91 |
| 10,014,076 B1 | 7/2018 | Laborde | |

(Continued)

FOREIGN PATENT DOCUMENTS

| | | |
|---|---|---|
| CN | 103946872 A | 7/2014 |
| CN | 204595903 U | 8/2015 |
| TW | M449311 U | 3/2013 |

OTHER PUBLICATIONS

International Examination Report for counterpart Taiwanese Patent Application No. 110124715, dated Nov. 18, 2022.

*Primary Examiner* — Kerri L McNally
(74) *Attorney, Agent, or Firm* — Rosenberg, Klein & Lee

(57) ABSTRACT

The present invention is a message updating system for an electronic label. The system comprises a message updating device, wherein a controller thereof controls a power-supply transmission unit and a message-update transmission unit to respectively transmit a charging signal and a message-updating to the electronic label for charging the electronic label and updating label information of the electronic label. A detection device picks up the label information to generate label content information, transmits the label content information to the controller to make the controller compare the label content information with update comparison information, and generates an alert message if the label content information is different from the update comparison information. The present can charge the electronic label that is mounted on an article and update label information simultaneously while the article is being transported.

10 Claims, 4 Drawing Sheets

(51) Int. Cl.
*G06F 18/22* (2023.01)
*G01V 8/10* (2006.01)

(56) References Cited

U.S. PATENT DOCUMENTS

| | | | |
|---|---|---|---|
| 2005/0151701 A1* | 7/2005 | Rosander | G06Q 20/201 |
| | | | 345/1.1 |
| 2009/0198508 A1* | 8/2009 | Minowa | G07G 1/0045 |
| | | | 705/1.1 |
| 2012/0000974 A1* | 1/2012 | Hung | G06F 3/147 |
| | | | 235/375 |
| 2016/0189507 A1* | 6/2016 | Rayner | A45C 13/18 |
| | | | 340/572.1 |
| 2018/0253997 A1* | 9/2018 | Williams | G06K 19/0709 |
| 2020/0394939 A1* | 12/2020 | Seo | G06K 7/1447 |
| 2021/0209550 A1* | 7/2021 | Bellows | G06Q 10/0875 |

* cited by examiner

MESSAGE UPDATING SYSTEM FOR ELECTRONIC LABEL

This application claims priority of Application No. 110124715 filed in Taiwan on 6 Jul. 2021 under 35 U.S.C. § 119; the entire contents of all of which are hereby incorporated by reference.

BACKGROUND OF THE INVENTION

Field of the Invention

The present invention relates to a message updating system, particularly to a message updating system for an electronic label.

DESCRIPTION OF THE PRIOR ART

Before boarding an airplane, the passengers normally have to check in at the check-in counter and check in the luggage bags simultaneously. The conventional technology still processes the check-in luggage manually; the luggage label is printed on a paper luggage sticker; the paper luggage sticker is then stuck to the luggage bag; the luggage label will be used for identification while the luggage bag is transported by a conveyor.

Printing the paper luggage sticker will consume time. The paper luggage sticker can only be used once and expends resource. The paper luggage sticker is likely to be worn and tainted. If the printing quality of the paper luggage sticker is poor, the recognizability of the paper luggage sticker would be affected, which may result in errors of luggage bag allocation and waste time and manpower. Therefore, users are more likely to use electronic-paper labels to replace the conventional luggage stickers now. However, passengers themselves still have to use an application program and wireless transmission to make the electronic labels present the pictures of luggage stickers now. Therefore, from the view of passengers, the current electronic label does not greatly increase their convenience.

Accordingly, the present invention proposes a message updating system for an electronic label to solve the abovementioned problems. During transportation of a luggage bag, the present invention can directly charge the electronic label and update the message of the electronic label, whereby to decrease the burden of passengers and service personnel, increase the efficiency of processing checked luggage, wherefore the abovementioned problems are effectively overcome.

SUMMARY OF THE INVENTION

The primary objective of the present invention is to provide a message updating system for an electronic label, which can charge the electronic label that is mounted on an article and update information simultaneously while the article is being transported, whereby to effectively increase the delivery efficiency of logistics.

In order to achieve the abovementioned objective, the present invention proposes a message updating system for an electronic label, which is used to provide label information to update an electronic label, and which comprises a message updating device that further comprises a controller generating a charging signal and a message updating signal and storing the message updating signal as update comparison information; at least one power-supply transmission unit, wherein the controller transmits the charging signal through the power-supply transmission unit to the electronic label for charging the electronic label; at least one message-update transmission unit connected with the controller, wherein the controller transmits the message updating signal through the message-update transmission unit to the electronic label for updating the label information of the electronic label; and a detection device connected with the controller and controlled by the controller, picking up the label information to generate label content information, transmitting the label content information to the controller to make the controller compare the label content information with the update comparison information, and generating an alert message if the label content information is different from the update comparison information.

In one embodiment, the message updating system for an electronic label further comprises a transportation device, which includes a start end and a termination end. The power-supply transmission unit, the message-update transmission unit and the detection device are disposed along the transportation device in sequence from the start end to the termination end. The transportation device is connected with the controller and controlled by the controller to transport the electronic label to pass through the power-supply transmission unit, the message-update transmission unit and the detection device in sequence.

In one embodiment, the electronic label includes a display screen presenting label information; the detection device is an image-capture device capturing the label information presented by the display screen.

In one embodiment, the power-supply transmission unit and the message-update transmission unit are antennae.

In one embodiment, the power-supply transmission unit and the message-update transmission unit are VHF (Very High Frequency) antennae.

In one embodiment, the message updating system for an electronic label further comprises an alert device. The alert device is connected with the controller to receive an alert message and emitting the alert message.

In one embodiment, the alert device is an audio alert device or a video alert device.

In one embodiment, the controller includes a database connected with the controller for storing the update comparison information.

In one embodiment, the message updating system for an electronic label further comprises an article sensor connected with the controller and disposed at the start end of the transportation device. While the article sensor senses that the electronic label passes through the start end, the article sensor generates an article message and transmits the article message to the controller, whereby to make the controller control the power-supply transmission unit and the message-update transmission unit to send out the charging signal and the message updating signal.

In one embodiment, the article sensor is an infrared sensor.

In one embodiment, while the controller finds in comparison that the label content information is different from the update comparison information, the controller controls the transportation device to send the electronic label located at the termination end back to the start end, whereby to transmit the charging signal and the message updating signal once again.

Below, embodiments are described in details to make easily understood the objectives, technical contents, characteristics and accomplishments of the present invention.

DETAILED DESCRIPTION OF THE INVENTION

The present invention is a message updating system for an electronic label, which is used in transportation of a luggage bag while the user boards an airplane. While the luggage bag is being transported, the message of the electronic label can be updated simultaneously. The present invention can decrease the waiting time of the ground service personnel and the passengers and effectively increase the delivery efficiency of logistics.

Figure 1:
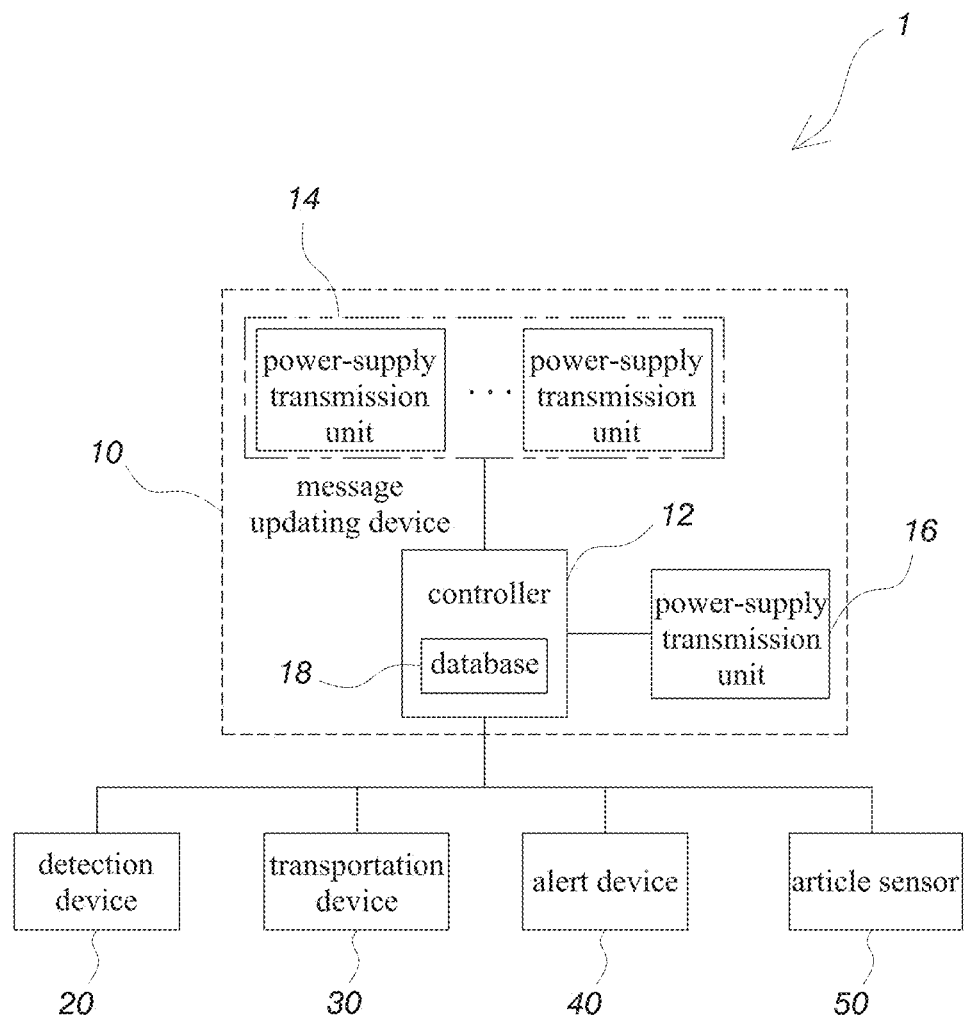
FIG. 1 is a block diagram of the system of the present invention.

Refer to FIG. 1 for the structure of the message updating system 1 for an electronic label according to one embodiment of the present invention. The message updating system 1 for an electronic label comprises a message updating device 10, a detection device 20, a transportation device 30, an alert device 40 and an article sensor 50. The message updating device 10 includes a controller 12, at least one power-supply transmission unit 14 and at least one message-update transmission unit 16. The controller 12 is connected with the power-supply transmission unit 14 and the message-update transmission unit 16 and controls the operations of the power-supply transmission unit 14 and the message-update transmission unit 16.

In one embodiment, the controller 12 is a computer having computational functions. The controller 12 includes a database 18 able to store data. The controller 12 can generate a charging signal and a message updating signal and respectively send out the charging signal and the message updating signal through the power-supply transmission unit 14 and the message-update transmission unit 16. After generating the message updating signal, the controller 12 stores the message updating signal in the database 18 and lets the message updating signal function as update comparison information.

The power-supply transmission unit 14 may be an antenna, such as a VHF (Very High Frequency) antenna. The power-supply transmission unit 14 is connected with the controller 12. The controller 12 sends out the charging signal through the power-supply transmission unit 14. The message-update transmission unit 16 may be an antenna, such as a VHF (Very High Frequency) antenna. The message-update transmission unit 16 is connected with the controller 12. The controller 12 sends out the message updating signal through the message-update transmission unit 16.

The detection device 20 is an image capture device, such as a video camera. The detection device 20 is connected with the controller 12 and controlled by the controller 12. The detection device 20 may provide the captured images to the controller 12 for application.

The transportation device 30 may be a conveyor. The transportation device 30 is connected with the controller 12. The transportation device 30 is controlled by the controller 12 to transport articles. The alert device 40 may be an audio alert device or a video alert device, such as a speaker or a screen. The alert device 40 is connected with the controller 12. The alert device 40 receives an alert message generated by the controller 12 and sends out the alert message.

The article sensor 50 may be an infrared sensor. While the article sensor 50 senses an article, the article sensor 50 generates an article message and transmits the article message to the controller 12.

Figure 2:
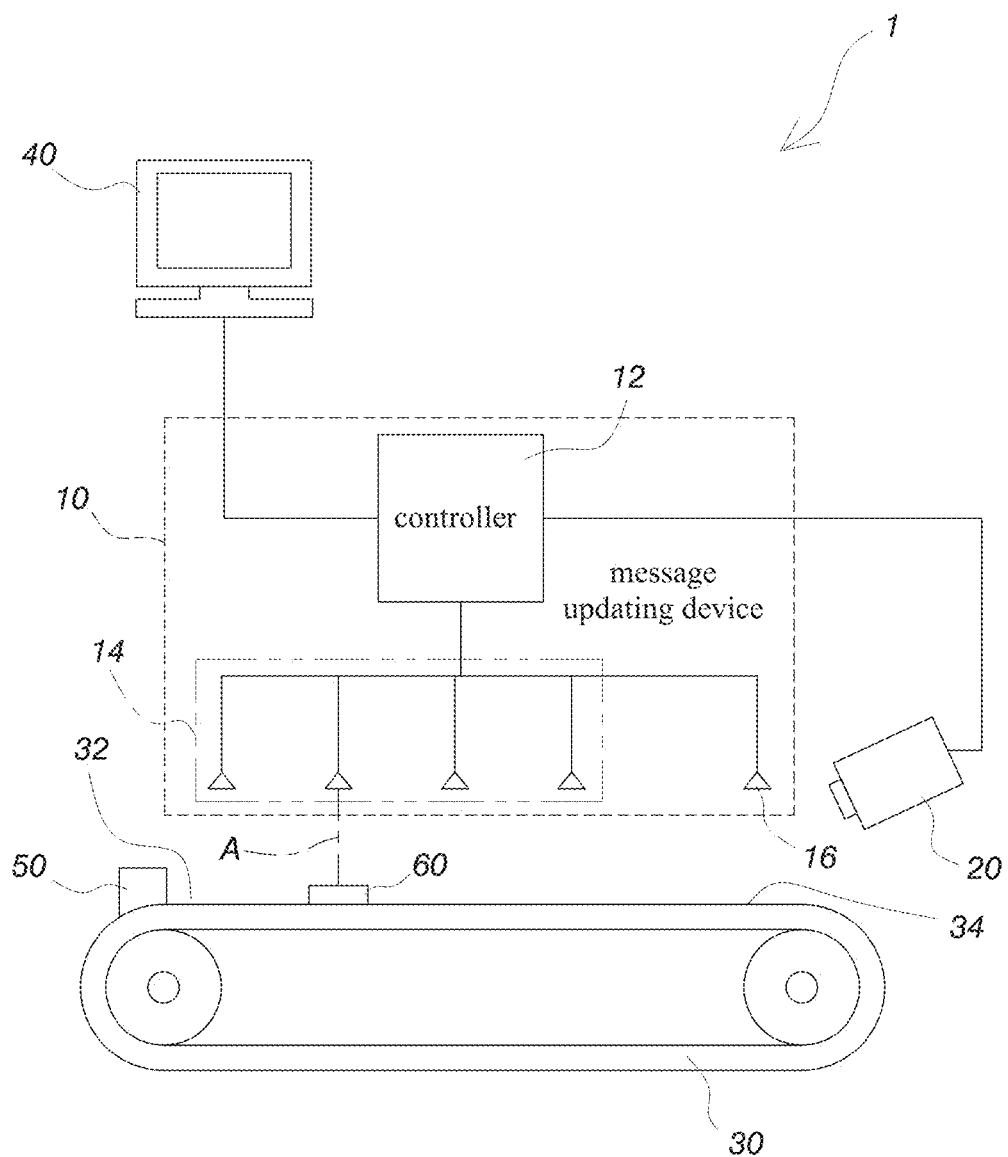
FIG. 2 is a diagram schematically showing the layout of the system according to one embodiment of the present invention.

After the introduction of the system of the present invention, the layout of the system of the present invention will be described below. Refer to FIG. 2. The transportation device 30 includes a start end 32 and a termination end 34. The article sensor 50, the power-supply transmission unit 14, the message-update transmission unit 16 and the detection device 20 are disposed along the transportation device 30 in sequence from the start end 32 to the termination end 34.

In details, the article sensor 50 is disposed at the start end 32 of the transportation device 30. In the embodiment shown in FIG. 2, the message updating device 10 includes a plurality of power-supply transmission units 14. The plurality of power-supply transmission units 14 is disposed near the start end 32 of the transportation device 30 in sequence. The message-update transmission unit 16 is disposed near the termination end 34. The detection device 20 is disposed at the termination end 34 of the transportation device 30. While the transportation device 30 is carrying a luggage bag with an electronic label 60, the electronic label 60 is transported through the power-supply transmission units 14, the message-update transmission unit 16 and the detection device 20 in sequence. The electronic label 60 is an electronic-paper label having a display screen able to present label information.

Refer to FIG. 1 and FIG. 2 for the practical process of updating the electronic label of the present invention. The electronic-paper label of a luggage bag of a passenger on board is used as an example herein. After the passenger has checked in, the ground service personnel needn't print an adhesive luggage label but only need to put the luggage bag on the transportation device 30. Then, the luggage label can be updated. In the process of updating the electronic label of the present invention, the luggage bag is placed on the transportation device 30 firstly. Next, the transportation device 30 is started to move the luggage bag and the electronic label 60. While the electronic label 60 passes through the article sensor 50, the article sensor 50 senses the electronic label 60 and generates an article message indicating that an article is detected and then transmits the article message to the controller 12. Next, the controller 12 controls the power-supply transmission units 14 and the message-update transmission unit 16 to respectively send out charging signals and a message updating signal.

Next, the transportation device 30 continues to transport the electronic label 60 to pass through the plurality of power-supply transmission units 14 in sequence. Next, the charging signals respectively sent out by the power-supply transmission units 14 are transmitted to the electronic label 60 to charge the electronic label 60.

Figure 3:
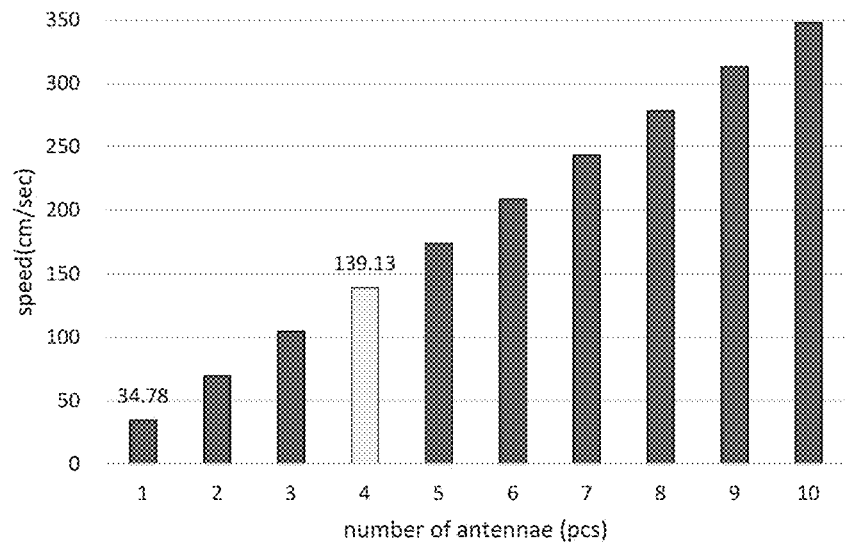
FIG. 3 is a diagram schematically showing the ratio of the transportation speed of the transportation device to the number of the power-supply transmission units for a vertical distance of 50 cm.
Figure 4:
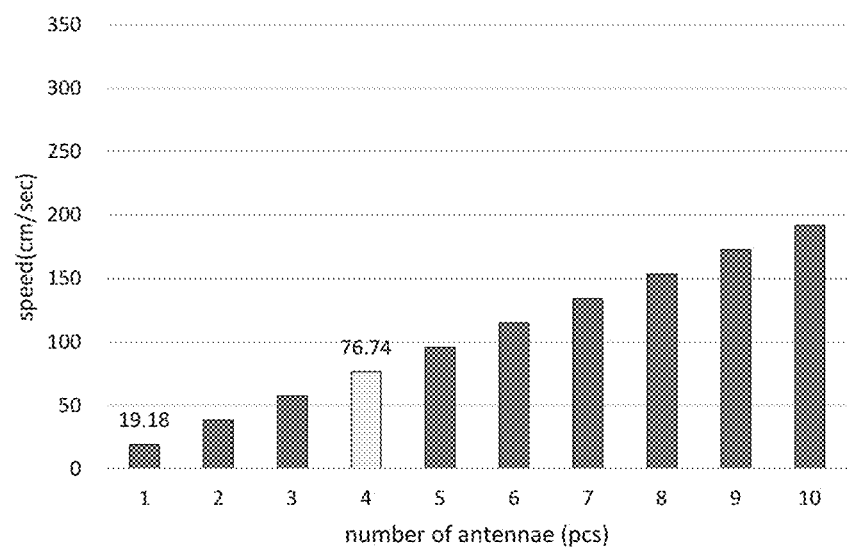
FIG. 4 is a diagram schematically showing the ratio of the transportation speed of the transportation device to the number of the power-supply transmission units for a vertical distance of 80 cm.

The charging efficiency is influenced by the distance between the power-supply transmission unit 14 and the electronic label 60, the transportation speed of the transportation device 30, and the number of the power-supply transmission units 14. Refer to FIG. 3. For example, in the case that the vertical distance between the power-supply transmission unit 14 and the electronic label 60 is 50 cm, while the transportation speed is 139.13 cm/sec, the optimized embodiment has 4 power-supply transmission units 14. Refer to FIG. 4. For example, in the case that the vertical distance A between the power-supply transmission unit 14 and the electronic label 60 is 80 cm, while the transportation speed is 76.74 cm/sec, the optimized embodiment has 4 power-supply transmission units 14.

Refer to FIG. 1 and FIG. 2 once again. After the charging signals are transmitted to the electronic label 60 through the power-supply transmission units 14, the transportation device 30 transports the electronic label 6 to pass through the message-update transmission unit 16, whereby the electronic label 60 can receive the message updating signal to update the label information presented on the electronic label 60.

Then, the transportation device 30 continues to transport the electronic label 60 to the detection device 20 at the termination end 34. The controller 12 controls the detection device 30 to capture the picture presented by the electronic label 60 to pick up the label information and generate label content information. Next, the detection device 30 transmits the label content information to the controller 12. Next, the controller 12 retrieves the update comparison information from the database 18 to compare the label content information with the update comparison information. If the label content information is different from the update comparison information, the controller 12 generates an alert message and transmits the alert message to the alert device 40 to make the alert device 40 present an audio alert or a video alert to remind the ground service personnel of the updating error of the electronic label 60. In one embodiment, while the controller 12 finds that the label content information is different from the update comparison information, the controller 12 automatically controls the transportation device 30 to send the electronic label 60 located at the termination end 34 back to the start end 32; then, the controller 12 instructs the transportation device 30 to transport the electronic label 60 to pass through the power-supply transmission units 14 and the message-update transmission unit 16 and let the power-supply transmission units 14 and the message-update transmission unit 16 transmit the charging signals and the message updating signal lest the electronic label 60 be updated incompletely.

Figure 5:
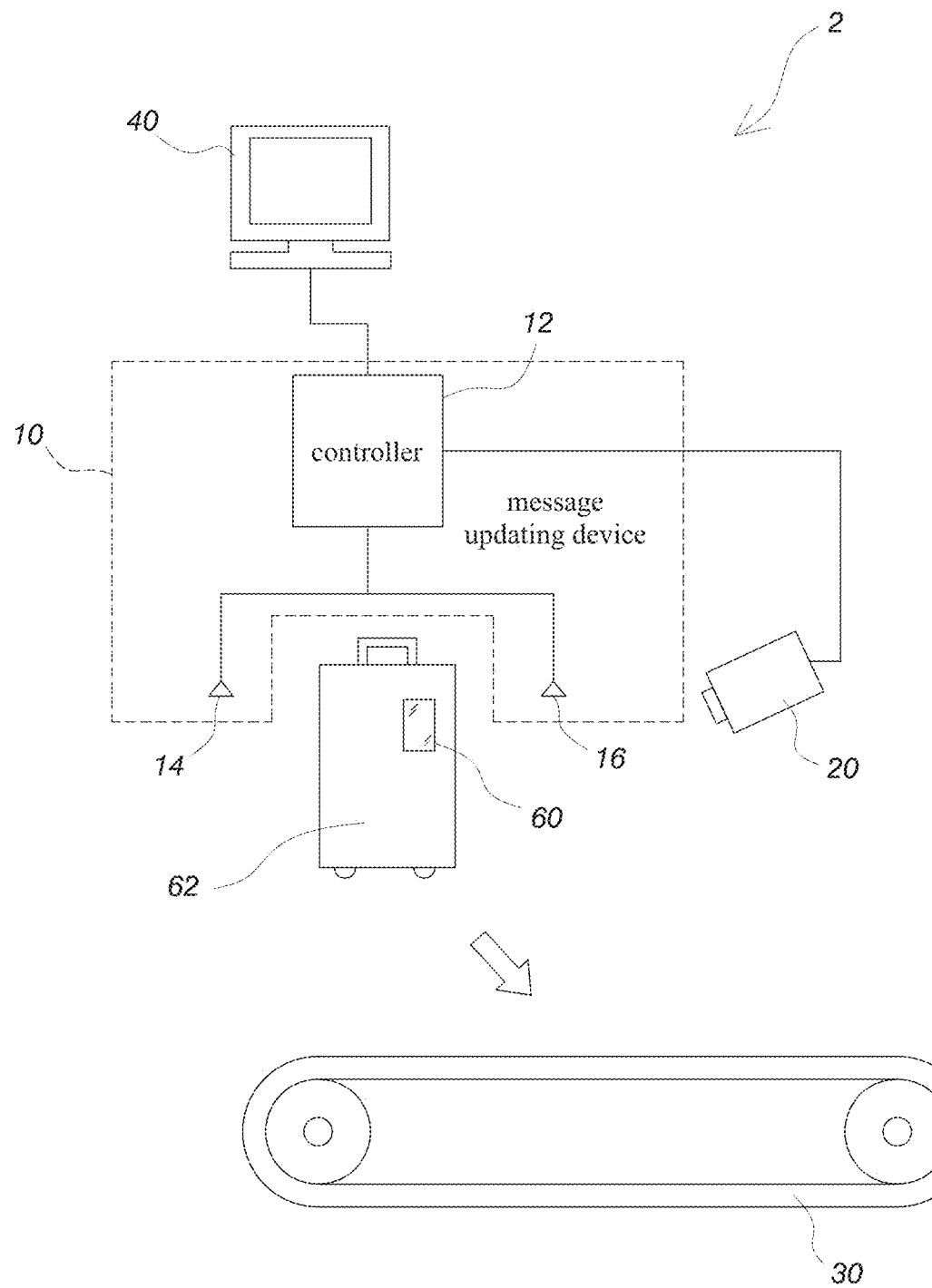
FIG. 5 is a diagram schematically showing the layout of the system according to another embodiment of the present invention.

Refer to FIG. 5 for another embodiment of the present invention. The electronic-paper label of a luggage bag of a passenger on board is also used as an example herein. In the embodiment shown in FIG. 5, the message updating system 2 for an electronic label comprises a message updating device 10, a detection device 20, a transportation device 30, and an alert device 40, wherein the signal connection of the message updating device 10, the detection device 20, the transportation device 30, and the alert device 40 is the same as the abovementioned embodiment and will not repeat herein. The embodiment shown in FIG. 5 is different from the embodiment mentioned above in the positions of the power-supply transmission unit 14 and the message-update transmission unit 16 of the message updating device 10, the detection device 20 and the transportation device 30 in space.

In the embodiment shown in FIG. 5, the power-supply transmission unit 14, the message-update transmission unit 16 and the detection device 20 are disposed at the same fixed place, which is different the abovementioned embodiment where the power-supply transmission unit 14, the message-update transmission unit 16 and the detection device 20 are disposed along the transportation device 30. In the embodiment shown in FIG. 5, the label information of the electronic label 60 carried by a luggage bag 62 is updated at a fixed place, wherein the power-supply transmission unit 14 and the message-update transmission unit 16 are respectively disposed at two sides of the luggage bag 62.

In the electronic label updating process of the embodiment shown in FIG. 5, the controller 12 uses the power-supply transmission unit 14 to transmit the charging signal to the electronic label 60 firstly; next, the controller 12 uses the message-update transmission unit 16 to transmit the message updating signal. Thereby, the label information presented on the electronic label 60 is updated.

Next, the controller 12 controls the detection device 20 to capture the picture presented by the electronic label 60 and transmit the label content information to the controller 12. Next, the controller 12 retrieves the update comparison information from the database 18 and compares the label content information with the update comparison information. If the label content information is different from the update comparison information, the controller 12 generates an alert message and transmits the alert message to the alert device 40 to make the alert device 40 generate an audio alert or a video alert to remind the ground service personnel of the updating error of the electronic label 60.

If the picture presented by the electronic label 60 is correct, the luggage bag 62 is placed on the transportation device 30 and transported to the rear end where the administration of the luggage bags is undertaken.

In conclusion, the present invention adopts a fully automatic data updating technology to simultaneously perform the electric charging operation and information updating operation of the electronic label carried by an article while the article is being transported, whereby to effectively increase the delivery efficiency of logistics.

The embodiments have been described above to demonstrate the principles of the present invention. However, these embodiments are only to exemplify the present invention but not to limit the scope of the present invention. Any modification or variation according to the spirit or characteristics of the present invention is to be also included by the scope of the present invention.

What is claimed is:

1. A message updating system for an electronic label, which is used to provide label information to update an electronic label, and which comprises
   a message updating device, further comprising
      a controller generating a charging signal and a message updating signal and storing said message updating signal as update comparison information;
      at least one power-supply transmission unit, connected with said controller, wherein said controller transmits said charging signal through said at least one power-supply transmission unit to the said electronic label for charging said electronic label; and
      at least one message-update transmission unit, connected with said controller, wherein said controller transmits said message updating signal through said at least one message-update transmission unit to said electronic label for updating said label information of said electronic label according to said message updating signal; and
   a detection device, connected with said controller and controlled by said controller, picking up said label information to generate label content information, transmitting said label content information to said controller to make said controller compare said label content information with said update comparison information, and generating an alert message if said label content information is different from said update comparison information;

wherein said at least one power-supply transmission unit and said at least one message-update transmission unit are antennae.

2. The message updating system for an electronic label according to claim 1 further comprising a transportation device, which includes a start end and a termination end, wherein said power-supply transmission unit, said message-update transmission unit and said detection device are disposed along said transportation device in sequence from said start end to said termination end; said transportation device is connected with said controller and controlled by said controller to transport said electronic label to pass through said power-supply transmission unit, said message-update transmission unit and said detection device in sequence.

3. The message updating system for an electronic label according to claim 1, wherein said electronic label includes a display screen presenting said label information; said detection device is an image-capture device capturing said label information presented by said display screen.

4. The message updating system for an electronic label according to claim 1, wherein said power-supply transmission unit and said message-update transmission unit are VHF (Very High Frequency) antennae.

5. The message updating system for an electronic label according to claim 1 further comprising an alert device, which is connected with said controller to receive said alert message and emit said alert message.

6. The message updating system for an electronic label according to claim 5, wherein said alert device is an audio alert device or a video alert device.

7. The message updating system for an electronic label according to claim 1, wherein said controller includes a database connected with said controller for storing said update comparison information.

8. The message updating system for an electronic label according to claim 2 further comprising an article sensor connected with said controller and disposed at said start end of said transportation device, wherein while said article sensor senses that said electronic label passes through said start end, said article sensor generates an article message and transmits said article message to said controller to make said controller control said power-supply transmission unit and said message-update transmission unit to respectively send out said charging signal and said message updating signal.

9. The message updating system for an electronic label according to claim 8, wherein said article sensor is an infrared sensor.

10. The message updating system for an electronic label according to claim 2, wherein while said controller finds in comparison that said label content information is different from said update comparison information, said controller controls said transportation device to send said electronic label located at said termination end back to said start end for transmitting said charging signal and said message updating signal once again.

* * * * *